US012424672B2

(12) United States Patent
Nowroth et al.

(10) Patent No.: US 12,424,672 B2
(45) Date of Patent: Sep. 23, 2025

(54) BATTERY SYSTEM COMPRISING A BATTERY MANAGEMENT SYSTEM AND A MOTOR VEHICLE

(71) Applicant: Webasto SE, Stockdorf (DE)

(72) Inventors: Julian Nowroth, Stockdorf (DE); Christian Ziegler, Stockdorf (DE); Christian Seidel, Stockdorf (DE); Maximilian Bushe, Stockdorf (DE); Marc Hartmeyer, Stockdorf (DE)

(73) Assignee: Webasto SE, Stockdorf (DE)

( * ) Notice: Subject to any disclaimer, the term of this patent is extended or adjusted under 35 U.S.C. 154(b) by 138 days.

(21) Appl. No.: 18/199,657

(22) Filed: May 19, 2023

(65) Prior Publication Data
US 2023/0411706 A1 Dec. 21, 2023

(30) Foreign Application Priority Data
May 19, 2022 (DE) .......................... 102022112664.1

(51) Int. Cl.
*H01M 10/42* (2006.01)
*H01M 10/48* (2006.01)
*H01M 50/204* (2021.01)
*H01M 50/249* (2021.01)
*H01M 50/296* (2021.01)
*B60L 50/64* (2019.01)
*B60L 58/10* (2019.01)

(52) U.S. Cl.
CPC ....... *H01M 10/425* (2013.01); *H01M 10/482* (2013.01); *H01M 50/204* (2021.01); *H01M 50/249* (2021.01); *H01M 50/296* (2021.01); *B60L 50/64* (2019.02); *B60L 58/10* (2019.02); *H01M 2010/4271* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 2019/0160972 A1* | 5/2019 | Zeiler | H01M 10/4257 |
| 2023/0163371 A1* | 5/2023 | Shine | H01M 50/20 |
| | | | 429/50 |
| 2024/0291290 A1* | 8/2024 | Trippel | H02J 7/0042 |

FOREIGN PATENT DOCUMENTS

DE 102016203923 A1 9/2017

* cited by examiner

Primary Examiner — Jared Fureman
Assistant Examiner — Aqeel H Bukhari
(74) Attorney, Agent, or Firm — Command IP LLP; Michael Zarrabian

(57) ABSTRACT

The present invention relates to a battery system for a motor vehicle, comprising a battery management system and at least two battery packs each having battery cells, at least one switch for switching the respective battery pack and a measuring device for measuring operating parameters of the battery cells, where the battery management system is arranged in precisely one of the battery packs and the switches of the other battery packs are controlled by the battery management system.

18 Claims, 3 Drawing Sheets

BATTERY SYSTEM COMPRISING A BATTERY MANAGEMENT SYSTEM AND A MOTOR VEHICLE

CROSS-REFERENCE TO RELATED APPLICATION

This application claims priority to German Application No. DE 10 2022 112 664.1 filed May 19, 2022, which is incorporated herein by reference in its entirety for all purposes.

TECHNICAL FIELD

The present invention relates to a battery system comprising a battery management system and a motor vehicle.

BACKGROUND

A master-slave system is often used to control a distributed battery system in which a plurality of battery packs are interconnected to form a common, logic battery, wherein the master is arranged in one battery pack and the slaves are arranged in further battery packs and each control the individual battery packs.

The disadvantage of this is that the battery packs with the slaves each require their own control device, for which special software must be developed and maintained. During the process of developing the software, in addition to integrating the software in the master-slave system, it is necessary, in particular, to flash new software for the slave control devices into the battery packs. For this purpose, it is necessary to directly access the slave control devices in the battery packs, in particular during the development process or maintenance, in order to be able to flash them using a needle adapter, for example. This may be difficult in the case of battery packs spatially distributed in a motor vehicle, where battery packs are difficult to access, in particular in the case of distributed battery systems.

Furthermore, when developing a distributed master-slave system for battery management, the number of hardware components and therefore the hardware development costs and the unit costs for the individual battery packs, in particular for the slave battery packs, are increased. The development and operation of a plurality of distributed control devices in a master-slave system for battery management are likewise very complex on account of the functional coordination and communication between the control devices.

EP 3 497 776 A1 thus discloses a battery unit comprising a plurality of replaceable battery packs, in which switching elements for adjusting a charging and discharging current in the individual battery packs are controlled by a master-slave system. In this case, the individual battery packs are substantially structurally identical, wherein one battery pack has a master control device and the other, replaceable battery packs each have a slave control device. In this case, all battery packs each accordingly have their own control device.

EP 3 687 027 A1 discloses a battery system comprising two battery packs which are controlled by means of a master-slave system. The slave control devices in the battery packs measure voltage, current and a state of charge and transmit the measured values to the master control device. The master control unit controls the switching elements in the battery packs according to evaluation of the measured values. All battery packs have their own control device.

US 2019/0229376 A1 discloses a battery management system for a battery consisting of a plurality of battery packs connected in series, which battery management system is organized in a master-submaster-slave system for transmitting commands and information for the individual battery cells. The master transmits signals to the submasters via an electrical data bus, wherein each submaster is responsible for one battery pack. The submaster converts the electrical signals into optical signals and transmits them, as optical signals, within the battery pack to the individual slaves for executing commands or for transmitting information to the submaster. In this case, a slave is assigned to each battery cell in the battery pack. In this case too, all battery packs have their own control device.

WO 2021/162740 A1 discloses a battery management system for balancing a battery consisting of a plurality of battery packs, which battery management system is organized in a master-slave system. In this case, one of the substantially structurally identical battery packs has the master and the other battery packs have the slaves which are connected to the master via a data bus and are replaceable, wherein all battery packs have their own control device.

DESCRIPTION OF THE INVENTION

Proceeding from the known prior art, it is an object of the present invention to provide a battery system having a simplified battery management system which can be maintained more easily.

The object is achieved by means of a battery system having the features of Claim 1. Advantageous developments emerge from the subclaims, the description and the figures.

Accordingly, a battery system, preferably for a motor vehicle, is proposed, comprising a battery management system and at least two battery packs each having battery cells, at least one switch for switching the respective battery pack and a measuring device for measuring operating parameters of the battery cells. The battery system is characterized in that the battery management system is arranged in precisely one of the battery packs and the switches of the other battery packs are controlled by the battery management system.

In other words, the switches in all battery packs are configured to be controlled directly by the one battery management system which is arranged in the one battery pack. This makes it possible to accordingly dispense with providing control devices in all other battery packs, thus considerably simplifying the maintenance of the battery system.

For the purpose of better distinguishing the battery packs, reference is also made below to a main module if it is that module in which the battery management system is provided. The other battery packs in which there is no battery management system are also referred to as satellite modules.

The battery packs may each have a measuring device for measuring an operating parameter of the respective battery cells in the battery packs and/or a switching element for changing a switching state of the battery pack with respect to the switching arrangement, which are each directly connected electrically and/or communicatively to the battery management system by means of a signal line. The operating parameter may be, for example, a voltage, a current, a temperature or a state of charge.

The battery management system may be in the form of an electronic control device, in particular an electronic control unit (ECU), and may be arranged in precisely one of the battery packs. The battery management system may be directly connected to the measuring device and/or the switch by means of the signal line for transmitting and/or receiving a signal and may be configured such that the switches of the other battery packs are directly controlled and/or the operating parameters are directly measured by the battery management system.

For this purpose, the battery management system may be provided as an electronic control unit (ECU) comprising at least one processor and/or at least one memory, wherein the memory stores program instructions which cause the at least one processor to carry out a method for controlling the switches and/or a measuring device for measuring an operating parameter of the respective battery cell in the battery packs. In other words, the battery management system may have a data processing apparatus or at least one processor device which is configured to carry out a method for controlling the switches and/or the measuring device, in particular for balancing the battery packs. For this purpose, the processor device may have at least one microprocessor and/or at least one microcontroller and/or at least one FPGA (field programmable gate array) and/or at least one DSP (digital signal processor).

The switch may be, for example, a transistor, in particular a field effect transistor (MOSFET) or a bipolar transistor (IGBT), or a relay. Furthermore, the processor device may have program code which is configured to carry out the embodiment of said method when executed by the processor device. The program code may be stored in a data memory or processor device.

This results in the advantage that battery packs which are arranged at locations in a motor vehicle which are spatially difficult to access do not require their own control devices. This may reduce the manufacturing and maintenance costs. Furthermore, it is possible to avoid developing and maintaining separate software for the control devices in the battery packs (satellite modules), which are not equipped with the battery management system and are preferably in the form of slave control devices, by directly connecting the actuator system and/or the sensor system to a single master control device such as said battery management system. In addition, the above-described concept of directly connecting the actuator system and/or a sensor system of the battery packs reduces the complexity of the software of an individual control device for battery management, in particular with respect to the master-slave interaction, diagnosis and maintenance and sleeping and wake-up processes of the individual control devices.

One embodiment provides for the signal line for transmitting and/or receiving a signal to be connected to the battery management system in a main module and to at least one electronic switching control device in at least one satellite module, wherein the battery management system is configured to control the switches in the respective satellite module by means of the signal via the respective switching control device. In other words, the switching control device in the respective satellite module may be configured to receive a signal for opening and/or closing the switches from the battery management system in the main module and to directly control the switches of the satellite module. In this case, the main module may comprise the battery management system and the respective satellite module may comprise the switching control device.

One embodiment provides for the battery management system and, in particular, a computing unit integrated therein to be configured to directly measure the operating parameter(s) of the battery cell by means of the measuring devices. In other words, a measuring device which is configured to measure an operating parameter of the respective battery cell may be provided in the main module and/or in the respective satellite modules. The operating parameter may be a voltage and/or a current and/or a state of charge and/or a temperature. For this purpose, the measuring device may be connected to the battery management system by means of a signal line. In this case, the battery management system may be configured to measure the operating parameter by means of the measuring device directly, in particular without a diversion via a slave control device.

For example, the measuring device may be in the form of a semiconductor component, for example a printed circuit board (PCB) and, in particular, a voltage measurement board, which, in a battery pack, is configured to measure a voltage of the battery cells connected thereto. For the purpose of measuring the operating parameter, said component may be connected directly to the battery management system by means of a signal line and may be configured to be directly controlled by the battery management system. This results in the advantage that the measuring device does not require its own software and the battery management system can directly measure the operating parameter of the respective battery cell in spatially distributed battery packs.

One embodiment provides for the battery management system to be directly connected to the measuring device and/or the switch by means of a signal line for transmitting and/or receiving a signal. In other words, the switch and/or the measuring device may be connected to the battery management system by means of a signal line, for example for transmitting an electrical or optical signal, wherein the battery management system is configured to directly control the measuring device via the signal line. The signal line may be configured to transmit an information signal, for example comprising a measured value of the operating parameter, and/or a signal for opening or closing a switch. For example, the signal line for controlling the switches or for controlling the measuring device, in particular the voltage measurement board, may be in the form of an electrical line. This results in the advantage that the switches and/or the measuring device do not require their own software.

One embodiment provides for the signal line for transmitting and/or receiving a signal to be connected to the battery management system in the main module and to at least one electronic measurement control device in the at least one satellite module, wherein the measurement control device is configured to carry out a voltage measurement in the satellite module, in particular at the battery cells of the satellite module. In other words, the battery management system in the main module may be configured to receive a signal comprising at least one measured value from the respective measurement control device in the respective satellite module by means of the signal line. The voltage measurement may be a high-voltage (HV) measurement. For example, the measurement control device may be configured to measure a voltage of an interconnection of the battery cells of the respective satellite module, for example a series or parallel circuit, and/or to form a total voltage of the satellite module by adding the individual voltages of the battery cells in a series circuit. The respective satellite module may additionally have the switching control device and the measurement control device, in which case these may be integrated in an electronic control unit (ECU). In this case, the battery management system may be configured to transmit an electrical signal to the electronic control unit and/or to receive an electrical signal from the electronic control unit by means of the signal line. The signal line may be, for example, an electrical or optical signal line, wherein the signal may respectively be an electrical or optical signal.

One embodiment provides for the respective battery packs to be spatially separated, preferably spatially distributed. In other words, the battery packs may be electrically connected to one another, in particular connected in series or in parallel, by means of the switching arrangement. The battery packs may each be electrically connected to the switching arrangement or disconnected from the latter by controlling the switches by means of the battery management system. The battery packs may be spatially distributed in a body of a motor vehicle, for example, and may be simultaneously electrically connected to one another by means of the switching arrangement. This results in the advantage that the battery system can act as a battery comprising individual, spatially separated battery packs.

For example, limited installation space in a motor vehicle can therefore be used better in order to accommodate as many battery cells as possible. In addition, if conventional platforms of motor vehicles that are based on internal combustion engines are electrified, this may considerably simplify the integration of the battery system into the motor vehicle. Furthermore, driving dynamics of the motor vehicle may be positively influenced by means of a uniform and/or variable weight distribution of the battery system in the motor vehicle. In particular, integration of a distributed battery system into the motor vehicle is particularly advantageous in the case of motor vehicles having special driving dynamics requirements and/or requirements for a special weight distribution of the motor vehicle, for example in sports cars.

One embodiment provides for the battery management system to be configured to evaluate an operating state of the battery cells, preferably the operating state of the battery system, by means of a computing unit. In other words, the battery management system may be configured to store a profile of the operating parameter measured by means of the measuring device in a memory, wherein the computing unit is configured to compare the operating parameter with a stored target value. In addition, the computing unit may be configured to interpret the profile of the measured value by means of a control algorithm and to initiate a countermeasure, for example to switch a pre-charging resistor on or off or to regulate the measured operating parameter to a target value by controlling the switches. This results in the advantage that the battery management system can monitor and, in particular, regulate the operating state of a distributed battery system without additional slave control devices in the satellite modules.

One embodiment provides for the battery management system to be configured to change a switching state of the respective battery pack with respect to a switching arrangement by means of the respective switch, in particular to electrically connect the respective battery pack to the switching arrangement or to disconnect it from the switching arrangement. In other words, the battery management system may be configured to switch the respective battery pack, in particular in the satellite module, on and off. In this case, switching on and off may mean that the battery pack can be disconnected from the battery system or can be incorporated into the battery system. This results in the advantage that a defective battery pack can be disconnected from the battery system, which improves operational reliability of the battery pack. Additionally or alternatively, the switching arrangement may be converted from a series circuit into a parallel circuit by controlling the switches.

One embodiment provides for the battery management system to be configured to balance the battery system via the switching arrangement by controlling the switch. In other words, the battery management system may be configured to regulate the respective battery packs, in particular the battery cells in the battery packs, to a common target value of an operating parameter, for example a voltage and/or a state of charge. For example, the battery management system can carry out the regulation by means of the computing unit. This results in the advantage that the distributed battery system is monitored and regulated like a single battery by the battery management system.

One embodiment provides for the battery management system to have a common electrical connection, preferably a terminal or a connector, for connecting the battery system to the charging apparatus and/or the electrical load. In other words, the battery system may have a common interface with respect to an external charging apparatus or an external electrical load. The electrical load may be, for example, an electric motor of a motor vehicle and/or another system component of the motor vehicle, for example a control device. The main module may comprise the connection as a common interface of the main and satellite modules. In this case, the connection may be designed for a direct current or an alternating current or a three-phase current. This results in the advantage that the battery system can be operated like a single, cohesive battery.

One embodiment provides for the battery management system to be configured to connect a pre-charging circuit for charging upstream of the battery system, in particular the respective battery pack, by means of the switch. In other words, the battery management system may be configured, for example, to receive a signal relating to the start of a charging operation from a battery main control device via the signal line or to additionally detect a charging current by means of the measuring device via the connection. If a voltage and/or current value measured by the measuring device at the connection exceeds a threshold value, for example, the battery management system may detect a charging operation. In order to provide current limitation for charging the battery system, the battery management system may be configured to connect a common pre-charging circuit upstream of the battery system. In addition, a pre-charging circuit may be separately provided in each case for the respective battery packs, which can be individually controlled by the battery management system. For example, it may be advantageous to individually connect a pre-charging circuit for the individual battery packs for the purpose of balancing in the event of a large deviation of an operating parameter for the purpose of increasing the service life.

The invention also provides a motor vehicle comprising said battery system, in particular a spatially distributed battery system. In other words, the battery system may comprise a plurality of battery packs which are spatially distributed in the motor vehicle but can be connected to a charging apparatus and/or an electrical load via a common connection. The motor vehicle is preferably in the form of an automobile, in particular a passenger car or lorry, or in the form of a minibus or motorcycle. The motor vehicle may be electrically driven (EV) or may be, in particular, a hybrid electric vehicle (HEV, PHEV), wherein the components provided for this purpose in the motor vehicle may each be an electrical load of the battery system.

The invention also comprises implementations which comprise a combination of the features of a plurality of the embodiments described.

BRIEF DESCRIPTION OF THE FIGURES

Preferred further embodiments of the invention are explained in more detail by means of the following description of the figures, in which.

DETAILED DESCRIPTION OF PREFERRED EXEMPLARY EMBODIMENTS

Preferred exemplary embodiments are described below using the figures. In this case, identical, similar or identically acting elements in the different figures are provided with identical reference signs and a repeated description of these elements is partially dispensed with in order to avoid redundancies.

Figure 1:
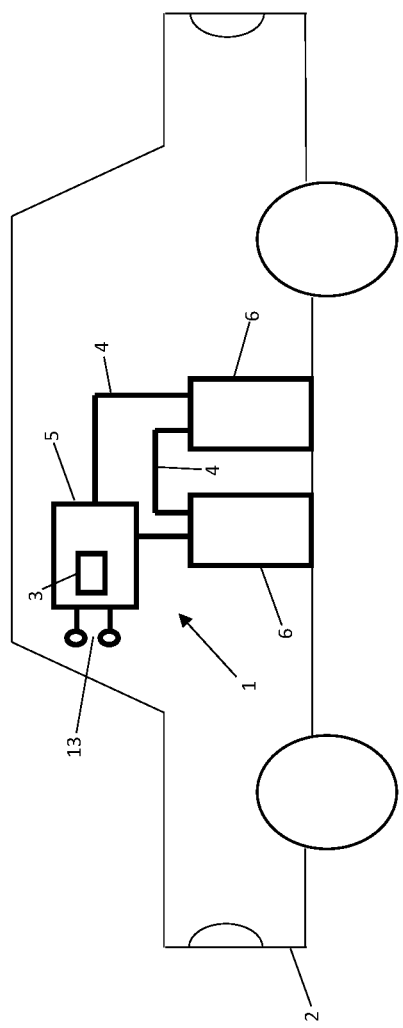
FIG. 1 shows a schematic illustration of a battery system spatially distributed in a motor vehicle.

FIG. 1 illustrates in a highly schematic manner a motor vehicle 2 which comprises a battery system 1. The battery system 1 may be provided, for example, for the purpose of supplying drive components or other components in the motor vehicle 2. The battery system 1 comprises, by way of example, three battery packs (with the reference signs 5 and 6) each comprising battery cells 7 (not illustrated in FIG. 1), wherein the battery system 1 may comprise at least one main module 5 and any desired number of satellite modules 6.

In the battery packs 5, 6, the battery cells 7 may also be organized in battery modules, wherein one battery pack 5, 6 may then respectively comprise a plurality of battery modules.

The battery packs are substantially structurally identical but are logically grouped into a main module 5 and a number of satellite modules 6. In this case, the main module 5 and the satellite modules 6 are electrically connected to one another in a switching arrangement 4. In FIG. 1, the switching arrangement 4 comprising the main module 5 and the satellite modules 6 is a series circuit. Alternatively, the switching arrangement 4 may also be a parallel circuit or a combination of a series circuit and a parallel circuit.

The main module 5 and the satellite modules 6 of the battery system 1 are arranged in a spatially distributed manner in the motor vehicle 2. It is therefore possible to make optimum use of installation space in the motor vehicle 2 in order to accommodate a battery system with an increased capacity. The battery system 1 may be electrically connected to a charging apparatus 11 and/or an electrical load 12 (each not illustrated) via the connection 13, with the result that the battery system 1 is visible as a single logic battery to the consumer or the charging device.

In other words, the battery system 1 presents itself to a load 12 or a charging apparatus 11 as a single battery with only one connection 13, with the result that nothing changes, in principle, for the respective load 12 or the charging apparatus 11 if the number of battery packs changes and, in particular, satellite modules 6 are added or removed—only the capacity of the visible battery changes thereby.

In contrast to the satellite module 6, the main module 5 has, as the only one of the battery packs, a battery management system 3. This may be in the form of an electronic control device and arranged in the main module 5, for example. The satellite modules 6 have only their own actuator system and/or sensor system and do not have their own control device. The satellite modules 6 therefore comprise, in addition to the battery cells 7, a switch and/or a measuring device 8, for example.

The main module 5 may also have the connection 13 for connecting the logic battery to an electrical load 12 and/or to an electrical charging apparatus 11 (not illustrated). However, this connection 13 may also be arranged on one of the other battery packs.

The battery management system 3 is electrically and/or communicatively connected in each case to the respective switches 9 and/or measuring devices 8 both in the main module 5 and in the satellite modules 6. The measuring device 8 may also be arranged in the battery management system 3 of the main module 5 or may be integrated therein. The battery management system 3 arranged in the main module 5 is configured to directly control the switches both in the main module 5 and in the satellite modules 6. In particular, it is possible to achieve control without a diversion via a slave control device in the satellite modules 6.

The battery management system 3 is likewise also directly connected to the measuring devices 8 in the main module 5 and in the satellite modules 6 and may communicate with the measuring devices 8 directly and without further diversions.

The respective switches 9 are configured in this case to switch the respective battery pack on and off, that is to say to disconnect it from the switching arrangement 4 or to electrically connect it to the latter.

The measuring devices 8 in the respective battery packs are configured to measure an operating parameter, for example a voltage, a current, a temperature and/or a state of charge, of the respective battery cell 7. The battery management system 3 can therefore control the switch 9 for switching the respective battery pack on and off in the battery packs, in particular in the satellite modules 6, directly and without a diversion via a slave control device and/or can directly measure an operating parameter.

This makes it possible to dispense with separate control devices in the satellite modules 6, which is advantageous for cost reasons, for reasons of the robustness of the system and for reasons of the maintenance of the system.

For example, it is possible to avoid flashing slave control devices again in the event of changes in the configuration or for updates in the satellite modules 6 which, on account of the spatial distribution, are often difficult to access, since the battery management system 3 in the main module 5 directly controls the respective switches 9 and/or the measuring device 8 in the satellite modules 6 and in the main module 5.

In other words, the start-up and the maintenance of the battery system 1 described here are considerably simplified in comparison with the conventional battery systems as a result of the described division of the battery packs into a main module 5, in which the battery management system 3 is arranged, and the satellite modules 6 which each do not have their own control device.

Figure 2:
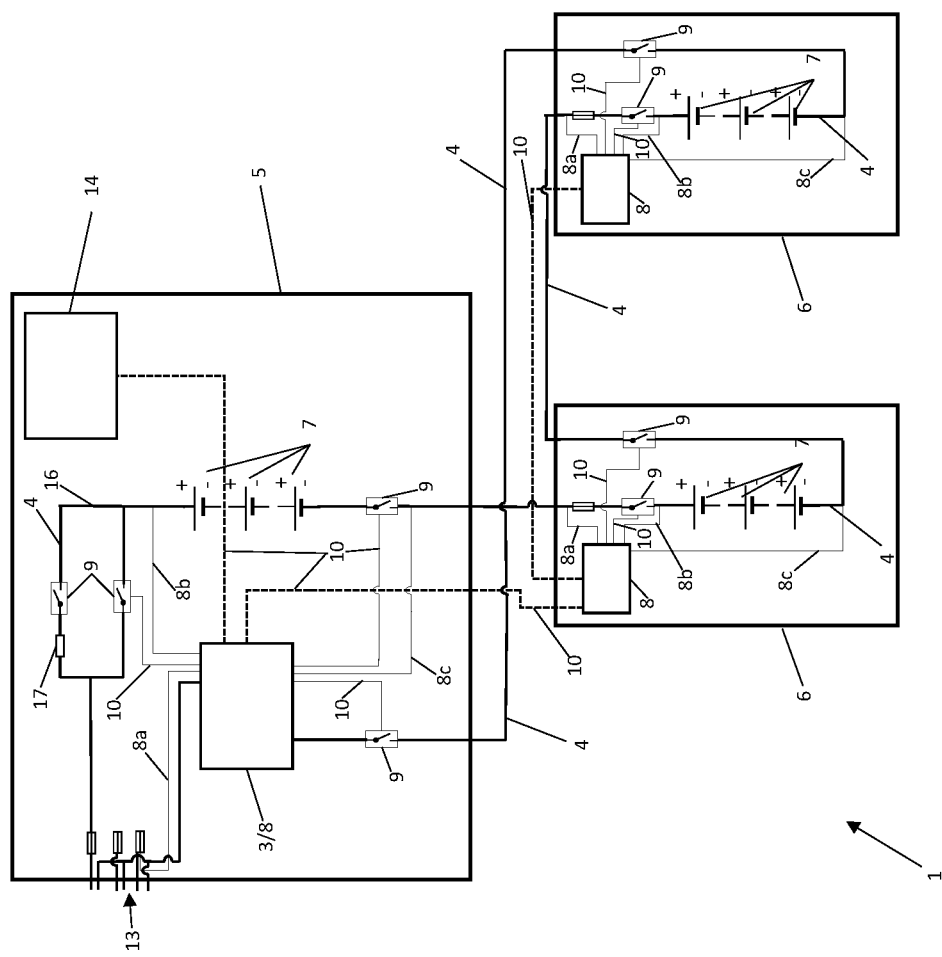
FIG. 2 shows a schematic illustration of the spatially distributed battery system.

FIG. 2 schematically illustrates the spatially distributed battery system 1. The battery system 1 here comprises three battery packs, wherein precisely one of the battery packs, here the main module 5, comprises the battery management system 3. The battery packs each comprise a multiplicity of battery cells 7 which may each be connected in series or in parallel with one another in the switching arrangement 4, for example. The satellite modules 6 are substantially structurally identical to the main module 5 in terms of the arrangement of the battery cells 7.

However, the satellite modules 6 do not have their own electronic control device, but rather only the physical switches 9 and/or the measuring device 8 for measuring an operating parameter of the battery cells 7. The main module 5 may likewise comprise at least one switch 9 and/or the measuring device 8 for measuring the operating parameter of the battery cells 7. The measuring device 8 may be, for example, in the form of a semiconductor component, in particular on a printed circuit board.

Accordingly, only the main module 5 has, as the only battery pack, the battery management system 3 which is directly connected to the switches 9 and/or the measuring devices 8 in the main module 5 and the satellite modules 6 by means of a signal line 10 and is configured to directly control them and/or to read out operating parameters as measured values. In this case, the battery management system 3 may be in the form of an electronic control device.

The main module 5 also has a common electrical connection 13 for connection to a charging apparatus 11 and/or an electrical load 12 (not illustrated). The connection 13 may be a terminal or a connector, for example, and may be designed for a direct current, an alternating current or a three-phase current. The battery system 1 therefore constitutes a single battery which comprises a plurality of battery packs 5 and 6 and is configured to be connected to the charging apparatus 11 and/or the electrical load 12 via the connection 13.

A pre-charging circuit 16, which can connect a pre-charging resistor 17 for limiting the charging current upstream of the battery system 1 by opening or closing the respective switch 9, can be connected upstream of the connection 13. For this purpose, the battery management system 3 may control the switch 9 in the pre-charging circuit 16 when switching on the battery to provide current limitation in order to charge capacitances or inductances possibly located on the load side with a limited current before the battery is fully enabled.

A pre-charging circuit 16 may therefore be provided in the main module 5 for the entire battery system 1 or separately for the respective battery pack 5 and 6, which pre-charging circuit can be activated and/or deactivated by the battery management system 3 by controlling the switches 9. For example, the battery management system 3 may receive a signal relating to the switching-on of the battery from a battery main control device 14. In response, the battery management system 3 may be configured to connect the pre-charging resistor 17 upstream of the respective battery packs 5 and 6 by controlling the switch 9 in order to provide current limitation.

Additionally or alternatively, the pre-charging circuit 16 may be provided separately in each case for the respective main module 5 and the satellite module 6, in particular for the purpose of providing current limitation during balancing in the event of a high deviation of an operating parameter in the respective battery packs 5 and 6.

The battery management system 3 is electrically and/or communicatively connected to the respective switch 9 and/or the measuring device 8 both in the main module 5 and additionally in the satellite module 6 by means of the signal line 10. For example, the battery management system 3 may open or close the respective switch 9 by means of an electrical signal via the signal line 10 in order to change a switching state of the main module 5 and/or of the satellite module 6 with respect to the switching arrangement 4.

For example, the main module 5 and the satellite module 6 may each be individually disconnected from the switching arrangement 4 or electrically connected to the switching arrangement 4.

Furthermore, the battery management system 3 may be communicatively connected to a battery main control device 14 and/or another external control device by means of the signal line 10, with the result that the battery management system 3 is configured to transmit signals comprising the operating state of the battery cells 7 to the battery main control device 14 and/or to receive signals from the battery main control device 14, for example a signal for starting the charging operation. The measuring device 8 may be, for example, a measuring instrument, in particular a voltage measurement board.

Additionally or alternatively, the measuring device 8 may be configured to measure a temperature, a current and/or a state of charge of the respective battery cell 7, wherein the measuring device 8 may be configured to measure the operating parameter for the respective battery cell 7 individually in each case for the respective battery cell 7. For example, as illustrated in FIG. 1, the measuring device 8 in the battery packs 5 and 6 may be configured to measure a voltage value at a terminal input 8*a* as well as upstream of 8*b* and downstream of 8*c* the bundle of battery cells 7 and to transmit the measured value 8 directly and, in particular, without a diversion via a slave control device to the battery management system 3 via the signal line 10. The signal line 10 is therefore used as an extended line to the measuring device 8. The signal line 10 may be an electrical or optical signal line 10, for example.

The battery management system 3 is likewise directly connected to the respective switches 9 in the battery packs 5 and 6 by means of the signal line 10 and may be configured to directly control them in each case. For this purpose, the signal line 10 may transmit, for example, an electrical signal for opening or closing to the respective switch 9 directly and, in particular, without a diversion via a slave control device. The battery management system 3 may therefore be configured to switch the respective satellite module 6 on or off by controlling the switches 9, in particular to disconnect the respective battery pack 5 and 6 from the switching arrangement 4 or to connect it to the latter.

Additionally or alternatively, the battery management system 3 and the switching arrangement 4 may be configured to switch the switching arrangement 4 of the battery packs 5 and 6 from a series circuit to a parallel circuit by opening or closing the switch 9 in the respective battery packs 5 and 6.

Furthermore, the battery management system 3 and the switching arrangement 4 may be configured to balance the respective battery packs 5 and 6 via the switching arrangement 4 by controlling the switches 9, with the result that all battery packs 5 and 6 and, in particular, the battery cells 7 have an identical operating parameter value, for example an identical voltage and/or an identical state of charge.

Figure 3:
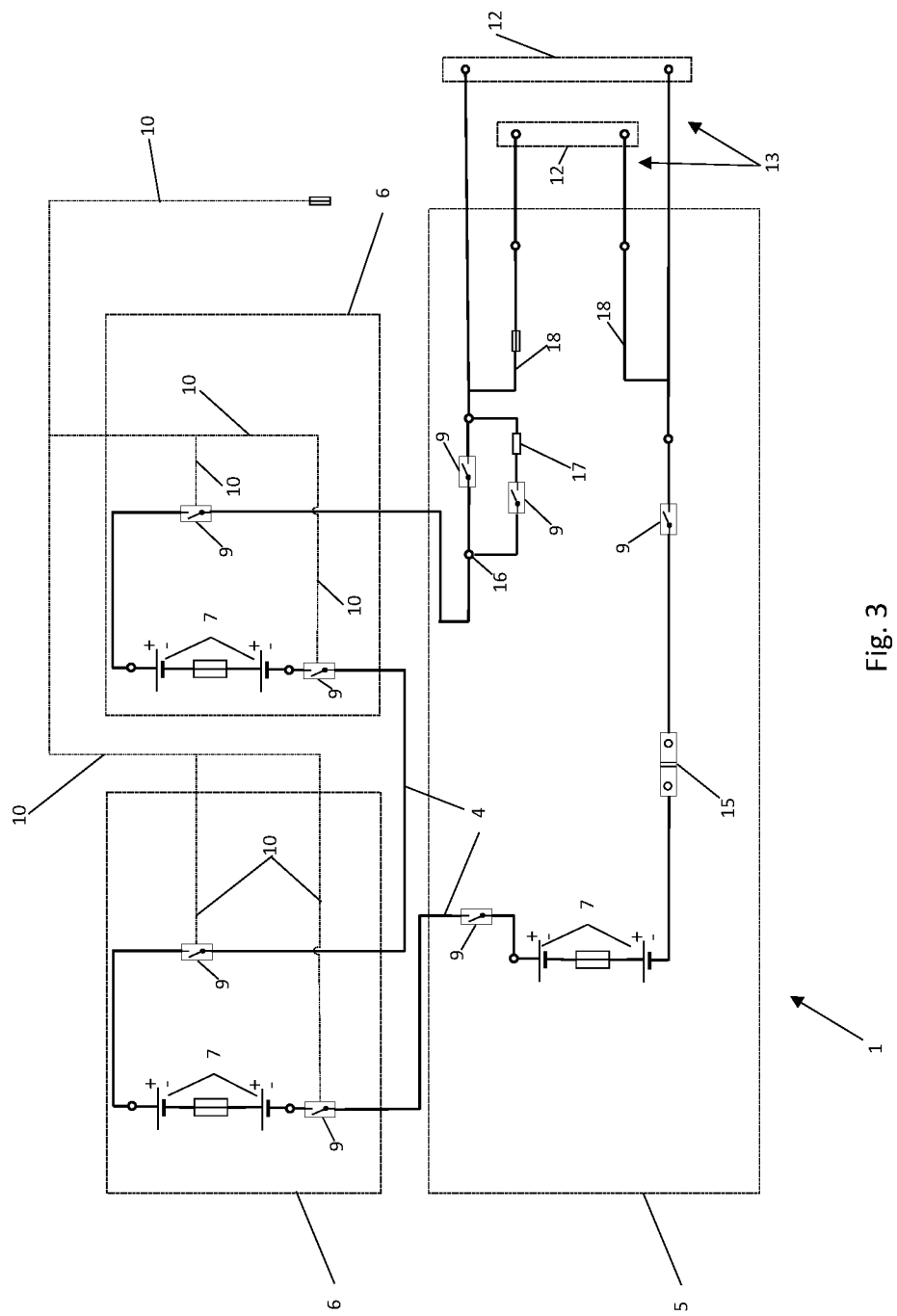
FIG. 3 shows a schematic circuit diagram of a switching arrangement of the battery packs of the battery system.

FIG. 3 illustrates a supplementary, schematic circuit diagram of the battery system 1 which is connected to a charging apparatus 11 or an electrical load 12 via the connection 13 of the main module 5. The electrical load 12 may be, for example, an electric motor of the motor vehicle 2. In addition, a further electrical load may be connected to the battery system 1 via a branch 18. Current conversion apparatuses are not illustrated here.

The main module 5 comprises the switches 9 and the pre-charging circuit 16 which are electrically connected to a bundle of battery cells 7 via the switching arrangement 4. The main module 5 additionally comprises an electrical fuse 15 with an earth contact. The main module 5 is therefore used as an interface for the battery system 1, with the result that the battery system 1 acts as a single battery, as seen from the outside, that is to say from the point of view of the electrical load 12 for example.

In addition, satellite modules 6 which do not have their own control devices may be connected downstream of the main module 5. The satellite modules 6 each comprise a bundle of battery cells 7 for increasing the battery capacity and may be arranged in a spatially distributed manner from the main module 5 in the motor vehicle 2. The satellite modules 6 comprise the switches 9 which can switch the respective satellite module 6 on or off, in particular can disconnect the satellite module 6 from the battery system 1 and/or can connect it to the latter. For this purpose, the switches 9 are connected to a signal line 10 which is configured to be directly connected to the battery management system 3 of the battery system 1 for direct control by means of the battery management system 3. The battery management system 3 is spatially separated from the satellite module 6 and is arranged in the main module 5, for example.

In this case, the satellite modules 6 do not have their own control devices, but rather only an actuator system, each controlled directly by the battery management system 3 via the signal line 10 without a diversion via a slave control device. This makes it possible to avoid flashing of control devices into battery packs of a spatially distributed battery system 1, which are spatially difficult to access, in particular in a development process. This is because it is often necessary to remove the affected control devices. This problem can be avoided by means of the described arrangement, that is to say by directly connecting the battery management system 3 to the actuator system 9 and/or the sensor system 8 in the battery packs by means of a signal line 10.

Overall, the example shows how a multipack battery system can be controlled by a single electronic control device, in particular an ECU.

If applicable, all individual features illustrated in the exemplary embodiments can be combined and/or replaced with one another without departing from the scope of the invention.

LIST OF REFERENCE SIGNS

1 Battery system
2 Motor vehicle
3 Battery management system
4 Switching arrangement
5 Main module
6 Satellite module
7 Battery cell
8 Measuring device
8a Terminal input
8b Terminal input
8c Terminal input
9 Switching element
10 Signal line
12 Electrical load
13 Connection
14 Battery main control device
15 Fuse
16 Pre-charging circuit
17 Pre-charging resistor
18 Branch

The invention claimed is:

1. A Battery system, comprising a battery management system and at least two battery packs each having battery cells, switches for switching the respective battery pack and a measuring device for measuring operating parameters of the battery cells, wherein the battery management system is arranged in precisely one of the battery packs and the switches of the other battery packs are controlled by the battery management system, wherein the battery management system is directly connected to the switches by means of a signal line for transmitting a signal.

2. The Battery system according to claim 1, wherein the battery management system is configured to directly measure operating parameters of the battery cells by means of the measuring devices.

3. The Battery system according to claim 2, wherein the battery management system is directly connected to the measuring devices by means of a signal line for at least one of: transmitting a signal and receiving a signal.

4. The Battery system according to claim 3, wherein the respective battery packs are spatially separated.

5. The Battery system according to claim 4, wherein the battery management system is configured to evaluate an operating state of the battery cells.

6. The Battery system according to claim 5, wherein the battery management system is configured to change a switching state of the respective battery pack with respect to a switching arrangement by means of the switches.

7. The Battery system according to claim 6, wherein the battery management system is configured to balance the battery system via the switching arrangement by controlling the switches.

8. The Battery system according to claim 7, wherein a common electrical connection for connecting all battery packs to at least one of: a charging apparatus and an electrical load is provided.

9. The Battery system according to claim 8, wherein the battery management system is configured to connect a pre-charging circuit upstream of the battery system.

10. The Battery system of claim 1, wherein the battery system is for a motor vehicle.

11. The Battery system according to claim 4, wherein the respective battery packs-are spatially distributed.

12. The Battery system according to claim 5, wherein the battery management system is configured to evaluate an operating state of the battery system.

13. The Battery system according to claim 6, wherein the battery management system is configured to change a switching state of the respective battery pack with respect to a switching arrangement to at least one of: electrically connect the respective battery pack to the switching arrangement and to disconnect the respective battery pack from the switching arrangement.

14. The Battery system according to claim 8, wherein the common electrical connection is at least one of: a terminal and a connector.

15. The Battery system according to claim 8, wherein the battery management system is configured to connect the pre-charging circuit upstream of the battery system is the respective battery pack, by means of the switches.

16. A Motor vehicle comprising a spatially distributed battery system, wherein the spatially distributed battery system comprises:
a battery management system;
at least two battery packs each having battery cells;
switches for switching the respective battery pack; and
a measuring device for measuring operating parameters of the battery cells;
wherein the battery management system is arranged in precisely one of the battery packs and the switches of the other battery packs are controlled by the battery management system, wherein the battery management system is directly connected to the switches by means of a signal line for transmitting a signal.

17. A Battery system comprising a battery management system and at least two battery packs each having battery cells, switches for switching the respective battery pack and a measuring device for measuring operating parameters of the battery cells, wherein the battery management system is arranged in precisely one of the battery packs and the switches of the other battery packs are controlled by the battery management system,
- wherein the battery management system is directly connected to the switches by means of a signal line for transmitting a signal,
- wherein the battery management system is directly connected to the measuring devices by means of a signal line for receiving a signal, and
- the battery management system is configured to receive a signal comprising at least one measured value of the battery cells from the respective measuring devices by means of the signal line.

18. A Battery system comprising a battery management system and at least two battery packs each having battery cells, switches for switching the respective battery pack and a measuring device for measuring operating parameters of the battery cells, wherein the battery management system is arranged in precisely one of the battery packs and the switches of the other battery packs are controlled by the battery management system,
- wherein the battery management system is directly connected to the switches by means of a signal line for transmitting a signal, wherein
- a pre-charging circuit is separately provided in each of the respective battery packs, and
- the battery management system is arranged to control each pre-charging circuit individually.

* * * * *